US008933913B2

(12) United States Patent
Nowatzyk et al.

(10) Patent No.: US 8,933,913 B2
(45) Date of Patent: Jan. 13, 2015

(54) ELECTROMAGNETIC 3D STYLUS

(75) Inventors: Andreas Nowatzyk, San Jose, CA (US); Charles P. Thacker, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 562 days.

(21) Appl. No.: 13/171,324

(22) Filed: Jun. 28, 2011

(65) Prior Publication Data

US 2013/0002614 A1 Jan. 3, 2013

(51) Int. Cl.
*G06F 3/045* (2006.01)
*G06F 3/046* (2006.01)
*G06F 3/0488* (2013.01)
*G06F 3/01* (2006.01)
*G06F 3/0354* (2013.01)

(52) U.S. Cl.
CPC .............. *G06F 3/046* (2013.01); *G06F 3/0488* (2013.01); *G06F 3/017* (2013.01); *G06F 3/03545* (2013.01); *G06F 2203/04101* (2013.01)
USPC .......................................... 345/179; 345/174

(58) Field of Classification Search
USPC ................................................. 345/156–179
See application file for complete search history.

(56) References Cited

U.S. PATENT DOCUMENTS

| 6,078,876 | A | 6/2000 | Rosenberg |
| 7,084,860 | B1 | 8/2006 | Jaeger |
| 7,126,590 | B2 | 10/2006 | Jelinek |
| 7,880,726 | B2 | 2/2011 | Nakadaira |
| 8,159,474 | B2 * | 4/2012 | Hauck ............................ 345/179 |
| 2003/0142073 | A1 * | 7/2003 | Fukushima et al. .......... 345/158 |
| 2004/0174337 | A1 * | 9/2004 | Kubota et al. ................. 345/156 |
| 2010/0038152 | A1 * | 2/2010 | Kaneda et al. ............. 178/18.07 |
| 2010/0085325 | A1 * | 4/2010 | King-Smith et al. .......... 345/174 |
| 2010/0095206 | A1 | 4/2010 | Kim |
| 2010/0234094 | A1 | 9/2010 | Gagner |
| 2012/0206419 | A1 * | 8/2012 | Lee et al. ....................... 345/179 |
| 2012/0306824 | A1 * | 12/2012 | Horie ............................. 345/179 |

OTHER PUBLICATIONS

Electronic Scripting Products, Inc. Business Plan—Published Date: Mar. 2007 http://4espi.com/ESPi_NaviScribe_BP.pdf.
Patriot—Retrieved Date: Mar. 16, 2011 http://www.vrealities.com/patriot.html.

* cited by examiner

*Primary Examiner* — Kent Chang
*Assistant Examiner* — Nelson Rosario
(74) *Attorney, Agent, or Firm* — Micah Goldsmith; Judy Yee; Micky Minhas

(57) ABSTRACT

A stylus system and method for determining the three-dimensional position and orientation of a stylus operating within a volume located above a surface of a display device is described. In some embodiments, the stylus system includes a stylus and a display device. The stylus senses one or more magnetic fields generated from a set of transmitting coils associated with the display device and transmits sensing information over an RF channel to a receiver in the display device. The display device determines the three-dimensional position of the stylus by applying a cell-based position reconstruction technique that compares the received sensing information with predetermined magnetic field values associated with one or more predetermined regions located above the surface of the display device. The cell-based position reconstruction technique accommodates magnetic field distortions due to the presence of conductive elements within or near the display device.

17 Claims, 18 Drawing Sheets

Coil driver 502

Coil driver 503

Coil driver 504

Coil driver 505

Coil driver 506

Coil driver 507

Coil driver 508

Coil driver 509

Signal generator 548

FIG. 5B

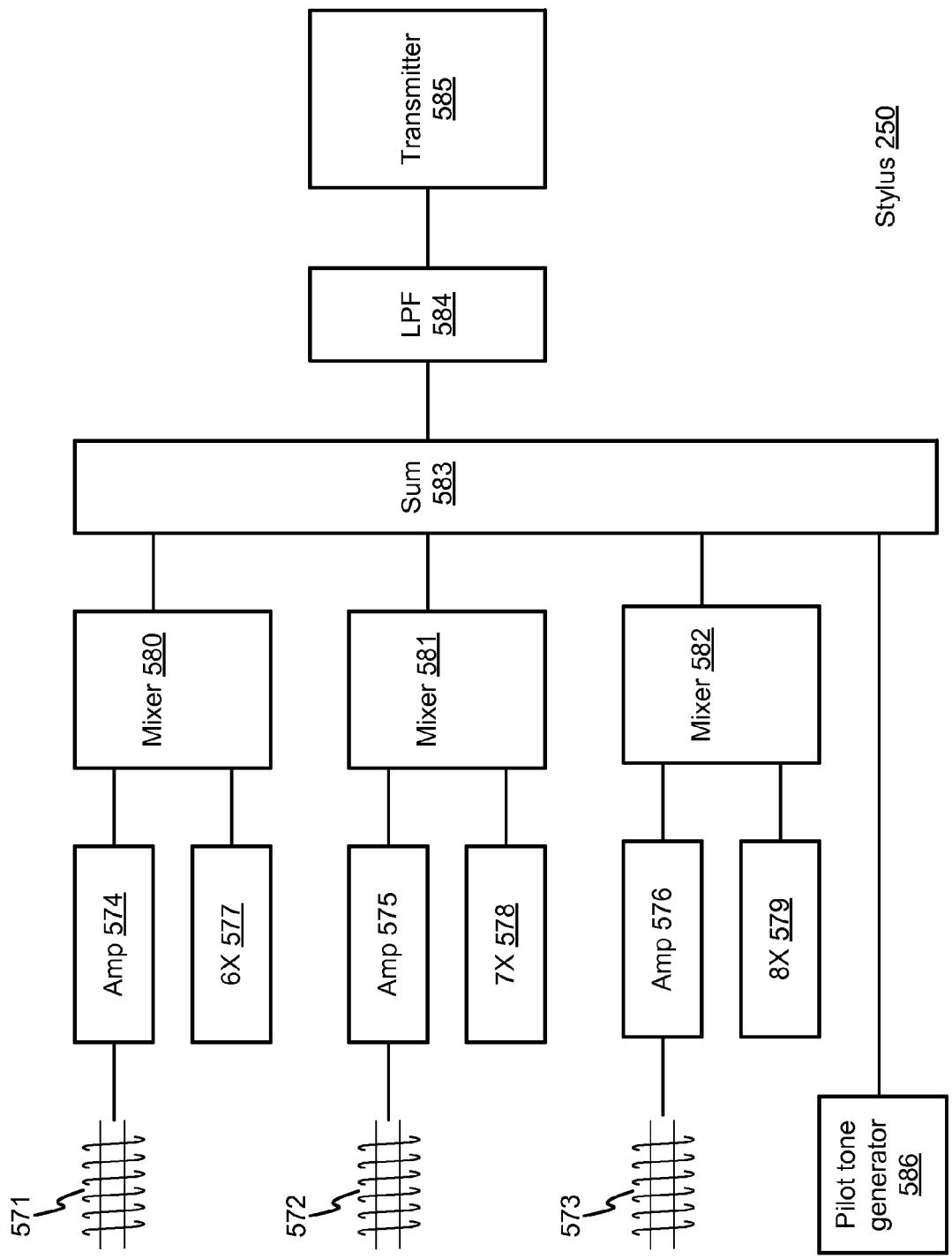

ELECTROMAGNETIC 3D STYLUS

BACKGROUND

Many mobile devices, such as tablet computers, utilize a touchscreen interface instead of a traditional keyboard interface. However, many touchscreen interfaces lack the precision necessary to capture detailed drawings and/or writings (e.g., cursive handwriting). In some cases, a stylus (or other writing utensil) may be used in order to improve the precision of a touchscreen interface. A stylus may be used in combination with either a resistive touchscreen interface or a capacitive touchscreen interface. A resistive touchscreen (i.e., one that detects changes in resistance) may sense where a stylus has made contact with a surface of the touchscreen. A capacitive touchscreen (i.e., one that detects changes in capacitance) may sense where a stylus has made contact with or has come close to a surface of the touchscreen.

Electromagnetic motion tracking technology based on near field electromagnetic propagation has been developed in the context of military applications. For example, electromagnetic coupling has been used to sense the position and/or orientation of a helicopter pilot's helmet during flight. The helmet tracking technology uses three transmitting coils and three receiving coils. The three transmitting coils and the three receiving coils both comprise three coils orthogonal to each other. The three transmitting coils are fixed with respect to a particular coordinate system inside the cockpit of the helicopter. The three receiving coils are attached to the pilot's helmet.

A driving current may be provided to each of the three transmitting coils in a time division manner in order to drive each of the three transmitting coils sequentially. This in turn produces three different magnetic fields, each magnetic field associated with one of the three transmitting coils as it is being driven. As the pilot turns his or her head, an induced voltage across each of the three receiving coils may be sensed in order to determine the strength and direction of the magnetic field generated by each of the three transmitting coils. Per Faraday's law of induction, the induced voltage across a particular receiver coil is proportional to the rate of change of the magnetic flux through the particular receiver coil. By relying on mathematical models (e.g., derived from equations developed from near field or far field electromagnetic theory) of the magnetic fields generated by each of the three transmitting coils, the helmet tracking system may determine the distance and orientation of the three receiving coils relative to the particular coordinate system inside the cockpit of the helicopter.

SUMMARY

Technology is described for providing a stylus system in which the three-dimensional position and orientation of a stylus operating within a volume located above a surface of a display device is determined. In some embodiments, the stylus system includes a stylus and a display device. The stylus senses one or more magnetic fields generated from a set of transmitting coils associated with the display device and transmits sensing information over an RF channel to a receiver in the display device. The display device determines the three-dimensional position of the stylus by applying a cell-based position reconstruction technique that compares the received sensing information with predetermined magnetic field values associated with one or more predetermined regions located above the surface of the display device. The cell-based position reconstruction technique accommodates magnetic field distortions due to the presence of conductive elements within or near the display device.

One embodiment includes generating one or more drive signals, each of the one or more drive signals is associated with a particular transmission coil of one or more transmission coils. The method further includes generating one or more magnetic fields and sensing one or more voltages. Each of the one or more voltages is associated with a particular receiving coil of one or more receiving coils, the one or more voltages are generated by the one or more magnetic fields. The method may further include transmitting sensing information based on the one or more voltages from a stylus to a display device and determining the position of the stylus within a volume located above a surface of the display device. The determining the position of the stylus includes determining a first region of one or more predetermined regions based on the received sensing information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5B depicts one embodiment of a signal generator.

FIG. 5E depicts one embodiment of a stylus.

DETAILED DESCRIPTION

Figure 1:
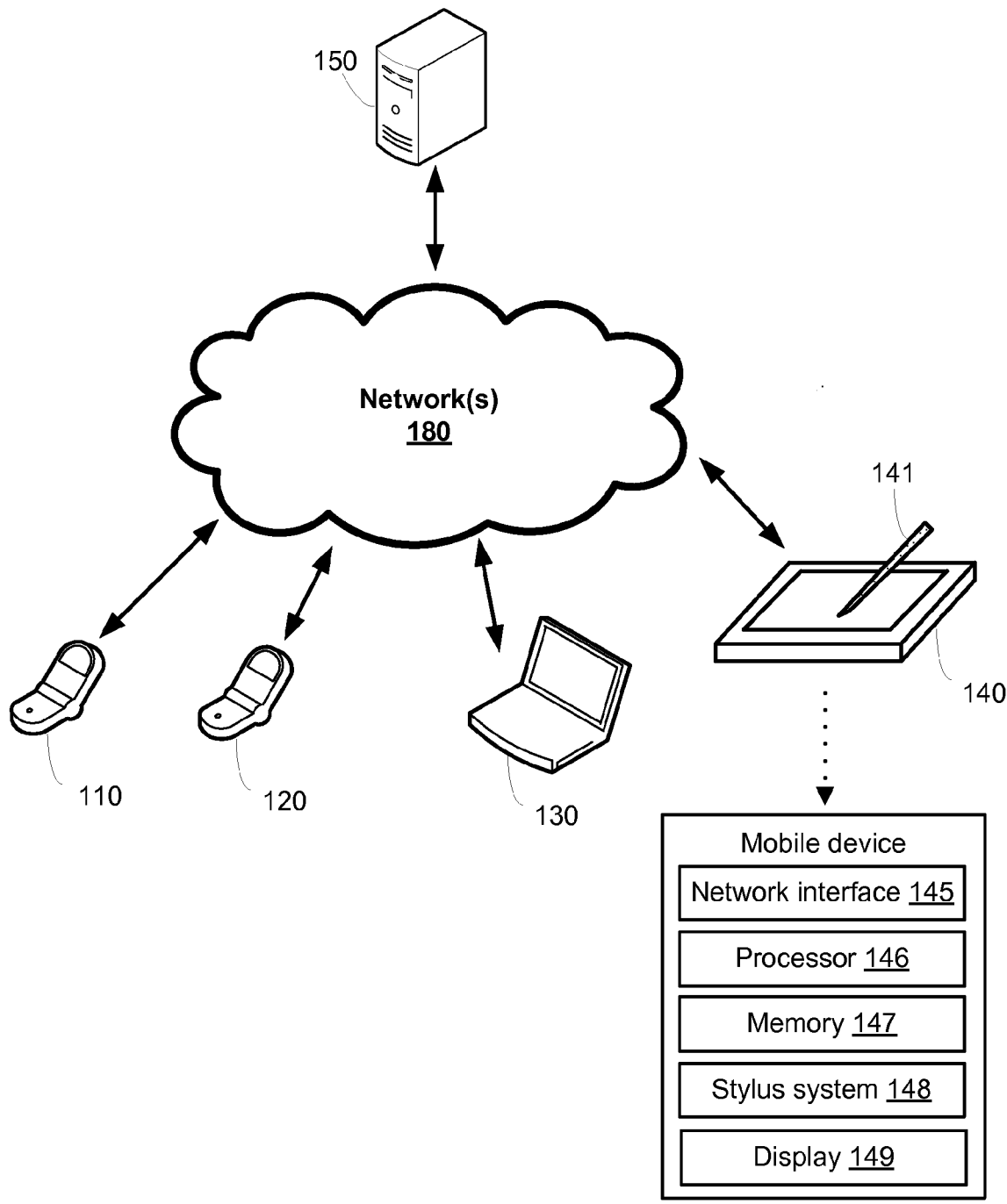
FIG. 1 is a block diagram of one embodiment of a networked computing environment in which the disclosed technology may be practiced.

Technology is described for providing a stylus system in which the three-dimensional position and orientation of a stylus operating within a volume located above a surface of a display device is determined. In some embodiments, the stylus system includes a stylus and a display device. The stylus senses one or more magnetic fields generated from a set of transmitting coils associated with the display device and transmits sensing information over an RF channel to a receiver in the display device. The display device determines the three-dimensional position of the stylus by applying a cell-based position reconstruction technique that compares the received sensing information with predetermined magnetic field values associated with one or more predetermined regions located above the surface of the display device. The cell-based position reconstruction technique accommodates magnetic field distortions due to the presence of conductive elements within or near the display device.

By sensing the position and orientation of a stylus and determining whether the stylus is in contact with a surface of a display device or within a particular region located above the surface of the display device, additional stylus input may be obtained. For example, hovering within a particular region above the surface of a display interface may correspond with a pointing or scrolling action, whereas touching the surface of the display interface may correspond with a selection or writing action. Further, 3D objects associated with a 3D display may be manipulated using a stylus when it is located above a display surface thereby enabling 3D user interfaces for applications such as 3D computer-aided design programs and 3D gaming applications.

One problem with electromagnetic position sensing is that it is susceptible to interference from the electronic emissions of a typical display device. Furthermore, conductive objects, such as the metal components located near the surface of a typical display device, may distort the electromagnetic fields caused by one or more transmitting coils. These distortions may cause errors in determining the position of a stylus located above the display surface. The amount of distortion resulting from surrounding objects depends on the conductivity and permeability of the objects and their size and location relative to the receiving and transmitting coils (or antennas). In one example, distortions may be caused by electromagnetic fields created by eddy currents generated within a metallic object, which in turn may disrupt or distort a magnetic field that is generated by a transmitting coil associated with a display device.

One problem with determining the position of a stylus above a display surface utilizing a signal strength analysis is that small errors in determining the magnetic field intensity at a point in space associated with the stylus may lead to large position errors. This sensitivity to position errors is due to the magnetic field intensity within the near field decreasing with the cube of the distance between a transmitting (or generating) coil and a receiving (or sensing) coil. The near field may be associated with a region close to the transmitting coil, where the wavelength of the signal being propagated is long compared with the distance between the transmitting coil and the receiving coil.

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 140, mobile devices 110 and 120, laptop computer 130, and application server 150. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

A server, such as application server 150, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of mobile device 140 includes a stylus system 148, display 149, network interface 145, processor 146, and memory 147, all in communication with each other. Display 149 may display digital images and/or videos. Display 149 may include a touchscreen user interface. Stylus system 148 may determine the position and orientation of a stylus, such as stylus 141, in relation to a surface of display 149. Network interface 145 allows mobile device 140 to connect to one or more networks 180. Network interface 145 may include a wireless network interface, a modem, and/or a wired network interface. Processor 146 allows mobile device 140 to execute computer readable instructions stored in memory 147 in order to perform processes discussed herein.

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer network diagrams to depict the Internet as an abstraction of the underlying infrastructure it represents.

In one embodiment of a stylus system 148, the three-dimensional position and orientation (i.e., the six degrees of freedom) of a stylus is determined by applying a cell-based position reconstruction technique. The cell-based position reconstruction technique may accommodate field distortions due to the presence of conductive objects within or near the surface of a display. The cell-based reconstruction technique includes comparing sensing information derived at the stylus with predetermined magnetic field values associated with one or more predetermined regions located above the surface of a display.

In addition, the stylus system 148 may utilize multiple, distributed transmitting coils in order to provide greater accuracy in position estimation (e.g., via ratio-metric range determination) compared with existing three orthogonal coil single path range determination designs. In one example, stylus system 148 detects the position of a stylus with a tenth of a millimeter accuracy and may update the position determination 200 times per second (i.e., has a position update rate of 200 position updates per second).

In some embodiments, the use of spread spectrum techniques (e.g., chirp spread spectrum) may be used to distinguish the electromagnetic signals associated with each of the multiple, distributed transmitting coils. This may allow for the use of a front-end receiver and may also minimize common mode errors. Furthermore, the simultaneous acquisition of the sensed signals from all three orthogonal receiving coils in the stylus may improve the position update rate.

In one embodiment, a simple RF transmitter may be used to transmit sensing information from the stylus to a stylus controller for processing. Transmitting sensing information associated with the voltage induced across the three orthogonal receiving coils in the stylus via an RF channel simplifies the design complexity of the stylus and may reduce the cost and power consumption associated with the stylus.

Figure 2:
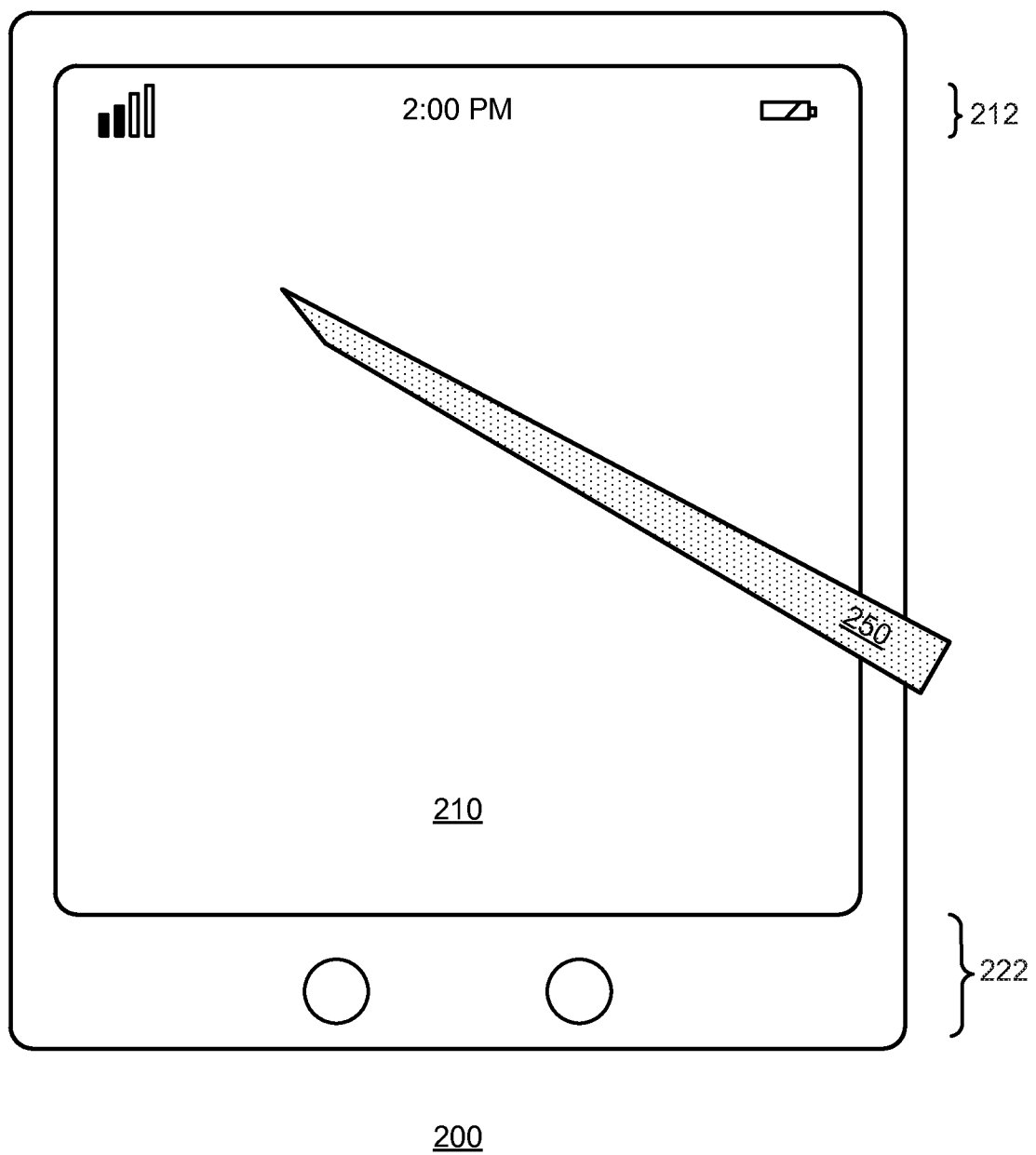
FIG. 2 depicts one embodiment of a display device.

FIG. 2 depicts one embodiment of a display device 200, such as mobile device 140 in FIG. 1. The display device 200 may be mobile or non-mobile. The technology described herein may be applied to both mobile and non-mobile devices. Display device 200 includes a touchscreen interface 210 and physical control buttons 222. The touchscreen interface may include an LCD display. The touchscreen interface 210 includes a status area 212 which provides information regarding signal strength, time, and battery life associated with the display device 200. A stylus 250 may be utilized to provide input information to display device 200 either by directly touching touchscreen interface 210 or by being positioned above the surface of touchscreen interface 210. The stylus 250 may comprise any writing utensil such as a pen-type stylus or a finger stylus.

Figure 3A:
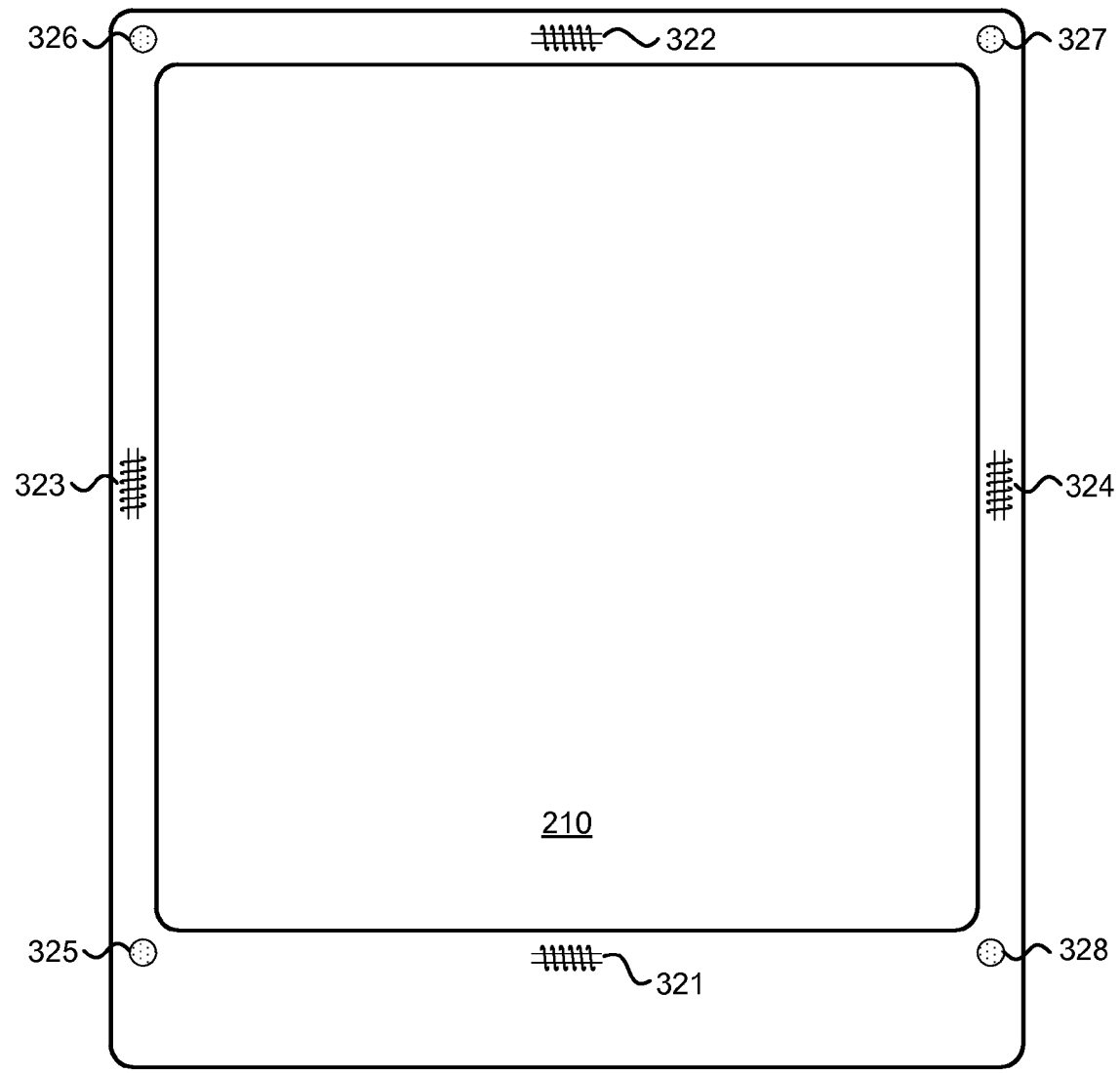
FIG. 3A depicts one embodiment of a display device including multiple transmitting coils.

FIG. 3A depicts one embodiment of a display device 200, such as mobile device 140 in FIG. 1, including multiple transmitting coils 321-328. The multiple transmitting coils 321-328 are distributed around touchscreen interface 210. Each of the multiple transmitting coils 321-328 may comprise a magnetic field generating element. Transmitting coils 321 and 322 are arranged in a first direction (e.g., the X direction). Transmitting coils 323 and 324 are arranged in a second direction (e.g., the Y direction). Transmitting coils 325-328 are arranged in a third direction (e.g., the Z direction). As depicted in FIG. 3A, the first direction is orthogonal to both the second direction and the third direction, and the second direction is orthogonal to both the first direction and the third direction.

Each of the transmitting coils 321-328 may generate a magnetic field via electromagnetic induction. In one example, a particular coil (e.g., transmitting coil 321) includes one or more wires wound around a core. The core may comprise a ferrite core. Applying a drive signal to the particular coil may cause a current to flow through the one or more wires associated with the particular coil. The drive signal may comprise one or more AC waveforms and/or one or more pulsed DC waveforms. Each transmitting coil may be driven by either a current pulse or a voltage pulse. In one example, transmitting coil 321 is energized with an alternating current within the 160 KHz to 190 KHz frequency range.

By utilizing more than three orthogonal transmitting coils within a single transmitter block and distributing the transmitting coils 321-328 along a larger base-line, the technology disclosed herein may measure the ratio of the magnetic fields from at least two transmitting coils in order to determine distance with higher accuracy via ratio-metric range determination. In some embodiments, at least two transmitting coils are arranged in a first direction and at least two other transmitting coils are arranged in a second direction orthogonal to the first direction. The transmitting coils 321-328 may be enclosed within a frame associated with display device 200.

Figure 3B:
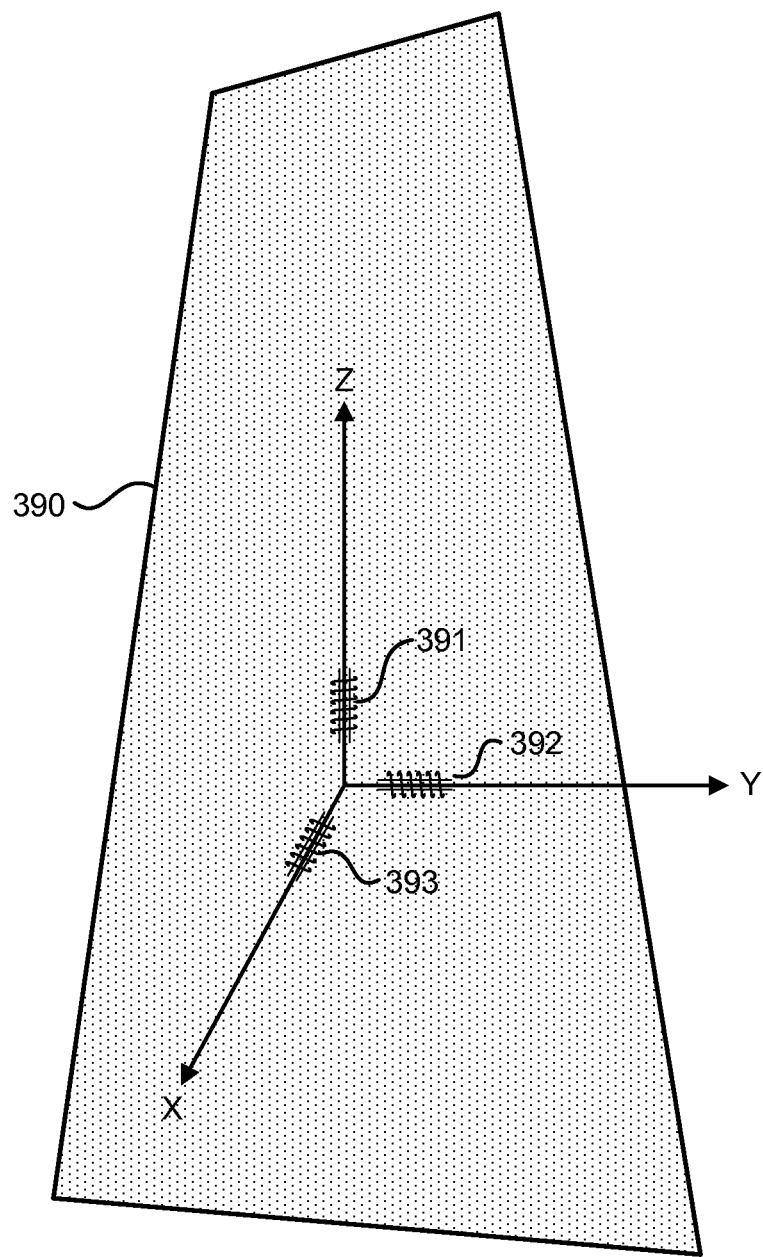
FIG. 3B depicts one embodiment of a portion of a stylus.

FIG. 3B depicts one embodiment of a portion 390 of a stylus, such as a portion 390 of stylus 250 in FIG. 2. The stylus 250 may comprise any writing utensil such as a pen-type stylus or a finger stylus. The portion 390 of a stylus includes three receiving coils 391-393. As depicted, the three receiving coils 391-393 comprise three receiving coils orthogonal to each other; the receiving coil 393 is arranged in the X direction, the receiving coil 392 is arranged in the Y direction, and the receiving coil 391 is arranged in the Z direction. Thus, each of the three receiving coils 391-393 may sense one orthogonal field component with respect to a stylus centric coordinate system.

Figure 4A:
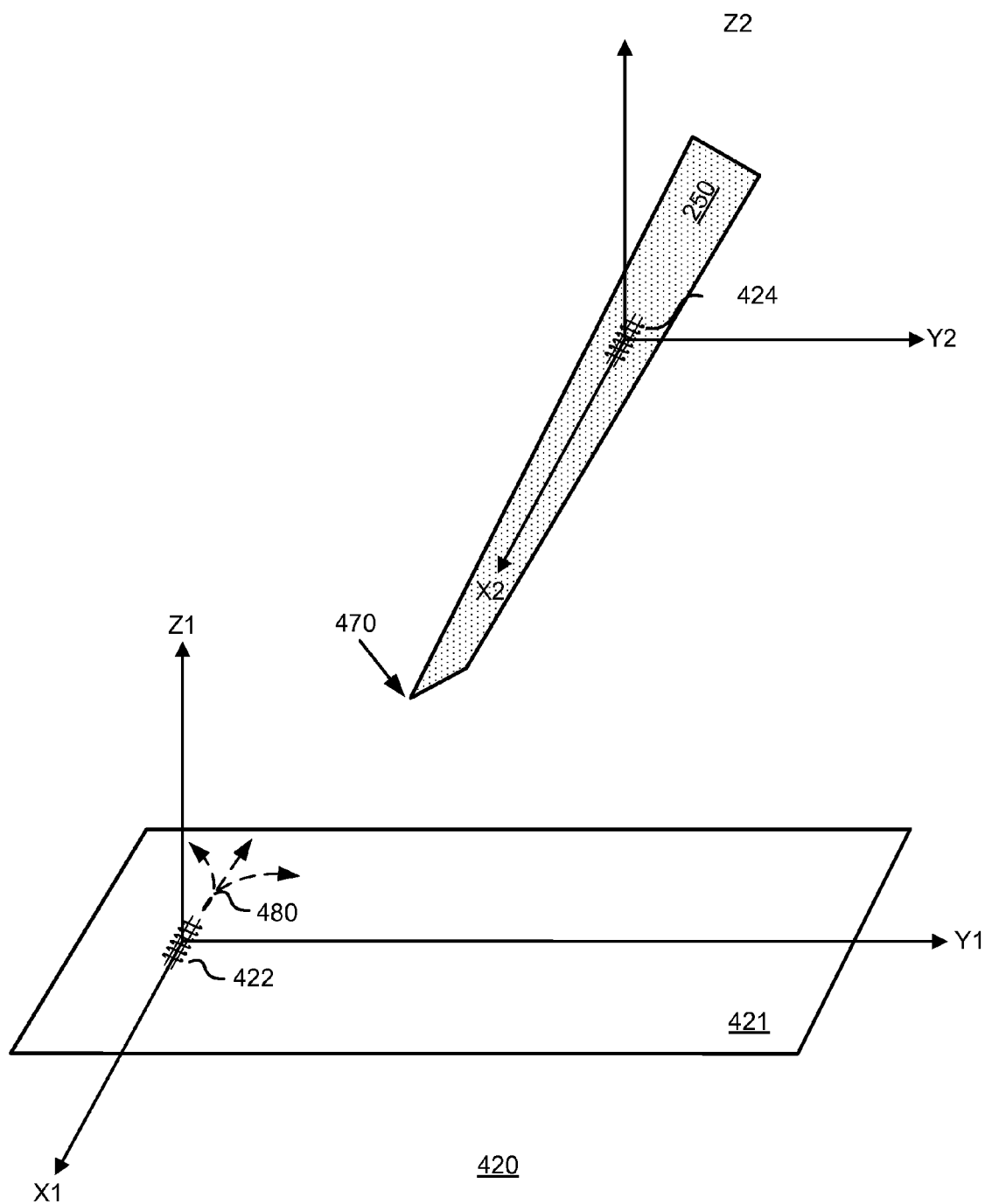
FIG. 4A depicts one embodiment of a portion of a stylus system.

FIG. 4A depicts one embodiment of a portion 420 of a stylus system, such as portion 420 of stylus system 148 in FIG. 1. The portion 420 of a stylus system includes a transmitting coil 422 and a receiving coil 424. Transmitting coil 422 may correspond with transmitting coil 321 in FIG. 3A. Receiving coil 424 may correspond with receiving coil 393 in FIG. 3B. The transmitting coil 422 may be positioned relative to a first coordinate system associated with a display surface 421. In one example, display surface 421 may be associated with a touchscreen interface, such as touchscreen interface 210 in FIG. 2.

The receiving coil 424 may be positioned relative to a second coordinate system associated with stylus 250. The receiving coil 424 may be offset from the tip of stylus 250 by a pre-determined distance (i.e., receiving coil 424 may be positioned at a fixed offset from stylus tip 470). Locating the receiving coil 424 away from the stylus tip 470 may reduce position errors caused by temperature variation and/or mechanical stress due to the stylus tip 470 being applied to the display surface 421.

As depicted, transmitting coil 422 generates a magnetic field including one or more field lines such as magnetic field lines 480. An induced voltage across receiving coil 424 may be sensed in order to determine the strength and direction of the magnetic field generated by transmitting coil 422. The strength and direction of the magnetic field generated by transmitting coil 422 may be used to determine the position and orientation of receiving coil 424 relative to the transmitting coil 422 or relative to the first coordinate system associated with the display surface 421. The position of receiving coil 424 may be described by particular X, Y, and Z coordinates associated with the first coordinate system. The orientation of the receiving coil 424 may be described using Euler angles, which may provide rotational information around the three orthogonal axes associated with the first coordinate system.

In one embodiment, a stylus system may comprise eight transmitting coils (e.g., the eight transmitting coils 321-328 of FIG. 3A) and three receiving coils (e.g., the three receiving coils 391-393 of FIG. 3B). The eight transmitting coils may be associated with a first coordinate system. The three receiving coils may be associated with a second coordinate system. In one example, each of the eight transmitting coils generates a magnetic field at a different time. The magnetic field intensity for each transmitting coil may be subsequently sensed by the three receiving coils at the eight different times. In another example, each of the eight transmitting coils generates a magnetic field associated with a different signal frequency. The magnetic field intensity associated with each of the eight transmitting coils may be determined via the eight different signal frequencies. Thus, the stylus system comprising eight transmitting coils and three receiving coils may produce 24 magnetic field measurements associated with the magnetic field strength from each of the eight transmitting coils to each of the three receiving coils.

The distance and orientation of the three receiving coils relative to the first coordinate system may be described using generic mathematical models of magnetic field intensity (e.g., an infinitesimal magnetic dipole model). Magnetic dipole models typically assume the transmitting coils are ideal and that the distance between the transmitting coils and the receiving coils is much larger than the radius of the transmitting coils. By utilizing generic mathematical models of magnetic field intensity, an over-determined, nonlinear system of 24 equations for six unknowns (i.e., the three position variables and the three orientation variables associated with the three receiving coils) may be determined and solved (e.g., by using an iterative method such as the Newton-Raphson method).

However, generic mathematical models of magnetic field intensity may not be sufficient to determine the true position and orientation of a stylus located above a display surface because of interference from the electronic emissions generated by a typical display device. Furthermore, conductive objects such as the metal components commonly located near the surface of a typical display device may distort the magnetic fields caused by one or more transmitting coils. This may in turn lead to significant errors in determining the position of a stylus located above the display surface because the modeled magnetic field intensity in the near field falls off rapidly with the distance from a transmitting coil.

Figure 4B:
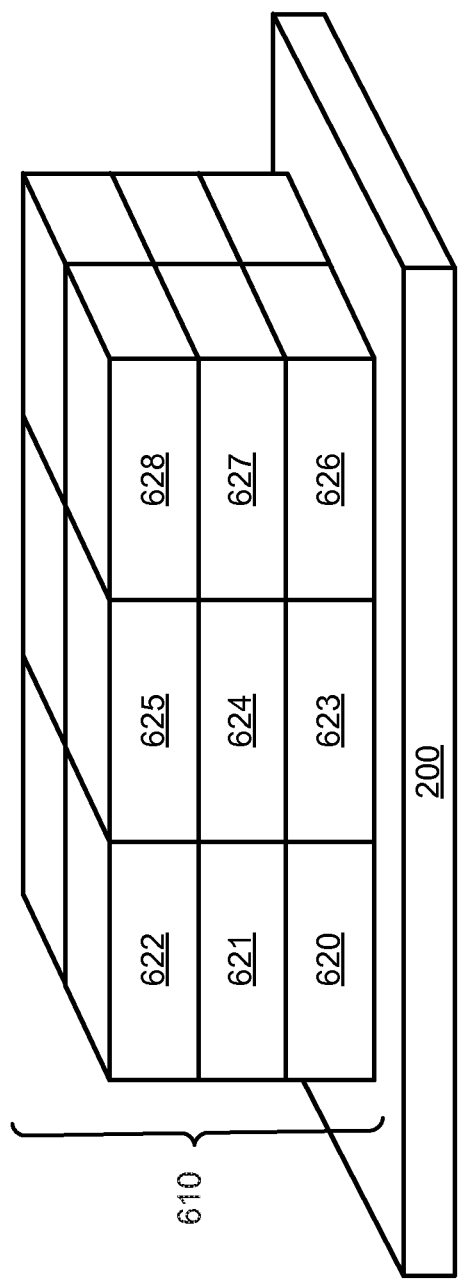
FIG. 4B depicts one embodiment of a display device and one or more predetermined regions located above the display device.

FIG. 4B depicts one embodiment of a display device 200 and one or more predetermined regions of space 610 located above the display device 200. The one or more predetermined regions (or cells) 610 may comprise a working volume located above the surface of display device 200. The one or more predetermined regions 610 may comprise a three-dimensional array of predetermined regions. As depicted, the three-dimensional array of predetermined regions includes a 3×2×3 array of predetermined regions. In one embodiment, the three-dimensional array of predetermined regions includes a 30×30×30 array of predetermined regions. The one or more predetermined regions 610 may be located relative to a surface of the display device 200. Each predetermined region of the one or more predetermined regions 610 may comprise a virtual sphere, virtual cube, virtual rectangular cell, or cubic region.

In one embodiment, each predetermined region is associated with a set of vectors, wherein each vector of the set of vectors includes magnetic field information associated with a particular position and a particular orientation of a model stylus positioned within the predetermined region. The set of vectors may be stored within a calibration table or calibration database on the display device. For a stylus system including eight transmitting coils and three receiving coils, each vector may include information related to 24 magnetic field measurements (e.g., each measurement may be associated with the magnetic field strength from each of the eight transmitting coils to each of the three receiving coils). Each vector may be determined prior to customer shipment using a calibration process. Furthermore, because magnetic field distortions due to the presence of conductive elements within or near the surface of a display device will be consistent across a particular product line of display devices, extensive calibration processes need only be performed prior to volume production of the display devices (i.e., extensive calibration need not be performed during volume manufacturing).

In some embodiments, a calibration process may include the positioning of a stylus above a display device using a robotic arm or other mechanical system. One or more measurements per predetermined region (or cell) may be made by positioning the tip of the stylus (or other stylus-related reference point) to be located within the predetermined region. In one example, six measurements per predetermined region are made. Each of the six measurements may be made by positioning a stylus tip to be located at a center point of the predetermined region. The six measurements may correspond with the positioning of a stylus about a coordinate system associated with the display device. For example, the stylus may be positioned in the positive X direction, the positive Y direction, the positive Z direction, the negative X direction, the negative Y direction, and the negative Z direction. One benefit of utilizing a cell-based calibration process is that it accommodates magnetic field distortions due to the presence of conductive elements within or near the display device.

In one embodiment, multiple measurements associated with different positions of a stylus tip within a predetermined region may be made. For example, each predetermined region may be associated with 10 measurement points. The vectors associated with each measurement may be consolidated or averaged into a single vector. The single vector may represent an average predetermined field magnitude for the predetermined region.

In another embodiment, for each predetermined region, the magnetic fields associated with each transmitting coil may be approximated by a set of functions (e.g., polynomials) with respect to a reference coordinate system associated with the display device. The set of functions may be chosen such that there are no discontinuities of the value in the first derivatives across the predetermined regions. In one example, a predetermined region is associated with one or more polynomials describing magnetic fields associated with each of one or more transmitting coils. A benefit of the set of functions approach per predetermined region is that larger predetermined regions may be utilized, thereby reducing the memory requirements necessary for a larger calibration table consisting of a larger number of predetermined regions.

Figure 5A:
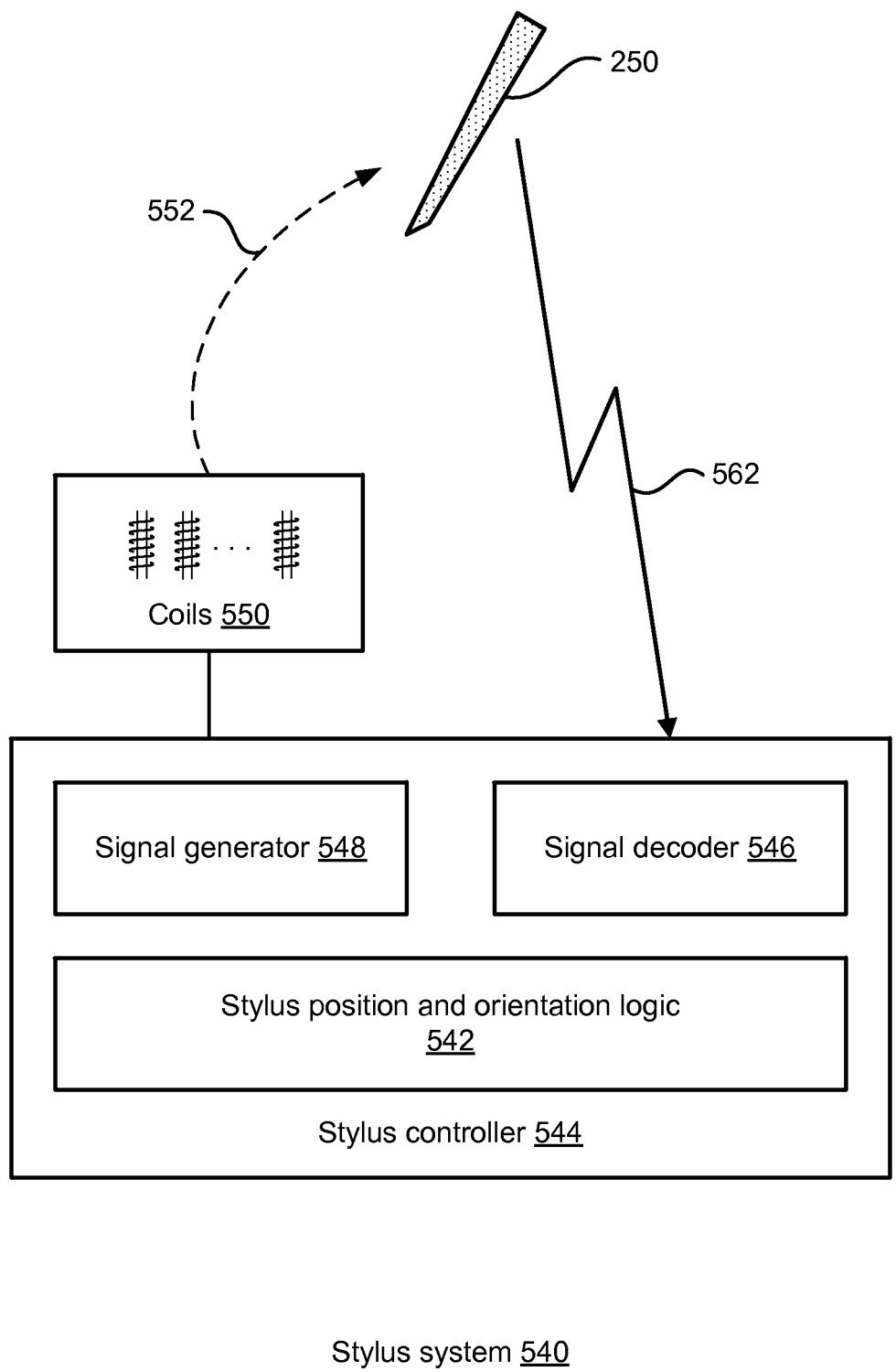
FIG. 5A depicts one embodiment of a stylus system.

FIG. 5A depicts one embodiment of a stylus system 540, such as stylus system 148 in FIG. 1. Stylus system 540 includes stylus controller 544, coils 550, and stylus 250. In one embodiment, the stylus controller 544 and coils 550 are enclosed within a frame associated with display device 200. Coils 550 includes one or more transmitting coils. Stylus controller 544 includes signal generator 548, signal decoder 546, and stylus position and orientation logic 542, all in communication with each other. The output of signal decoder 546 may comprise a set of field numbers that represent the sensed field strength from each transmitting coil to each of the three receiving coils in the stylus. The stylus position and orientation logic 542 may determine the position and orientation of a stylus using the set of field numbers.

In one embodiment, the stylus controller 544 energizes one or more transmitting coils within coils 550, thereby generating one or more magnetic fields 552 at a particular point in time. Subsequently, stylus 250 generates sensing information associated with the one or more magnetic fields 552 and transmits the sensing information to stylus controller 544 via RF channel 562 for processing. Finally, the stylus controller 544 converts the sensing information into coordinates associated with a position of stylus 250. In one embodiment, the entire stylus controller 544 (or portions thereof) may be implemented in software using a digital signal processor (DSP) or implemented using an FPGA. In some embodiments, stylus position and orientation logic 542 implements a cell-based position reconstruction technique in order to determine the position and orientation of a stylus.

In some embodiments, stylus position and orientation logic 542 may determine that the position of stylus 250 is within a first proximity of a near coil of the one or more transmitting coils within coils 550. One potential issue with the stylus being too close to the near coil is that the signal that the stylus receives from the near coil may be much larger (and stronger) than the signal it receives from a far coil of the one or more transmitting coils. This issue is also known as the near-far problem. Due to the near-far problem, errors in determining the position of stylus 250 may occur if the signals from the near coil drown out the signals from the far coil (e.g., due to the limited dynamic range of the receivers within a stylus). As the received signals are always proportional to the transmitted signals, if the transmitted signal amplitude used to drive the near coil is cut in half, then the corresponding signal received by the stylus will be cut in half. In one embodiment, when stylus position and orientation logic 542 determines that stylus 250 is within the first proximity of the near coil, it reduces the amplitude (or power) of the signals used to drive the near coil by a particular factor and then corrects for this reduction by multiplying the received signal by the inverse of the particular factor. In another embodiment, the stylus position and orientation logic 542 dynamically adjusts a particular drive signal associated with a particular transmission coil depending on the amplitude of the corresponding signal received at the stylus.

FIG. 5B depicts one embodiment of a signal generator 548. Signal generator 548 includes coil drivers 502-509. Each coil driver may be associated with and drive a particular transmitting coil. For example, the eight coil drivers 502-509 may be used to drive the eight transmitting coils 321-328 in FIG. 3A. Each coil driver, such as coil driver 502, may generate a drive signal. The drives signals may include AC waveforms or pulsed DC waveforms.

One method for driving one or more transmitting coils is to energize the transmitting coils sequentially in time (i.e., time multiplexing the generation of magnetic fields). One drawback of time multiplexing the generation of magnetic fields is that achieving a high update rate may be problematic. Another method for driving one or more transmitting coils is to utilize a different signal frequency for each of the one or more transmitting coils (i.e., frequency-division multiplexing). However, the frequency-division multiplexing approach may suffer from errors due to interference from noise signals (e.g., due to system clocks) affecting the magnetic fields generated at a particular frequency without affecting the magnetic fields generated at other frequencies.

In one embodiment, spread spectrum techniques may be utilized to distinguish the different signals generated from multiple transmitting coils. Several different spread spectrum signals may be used such as direct sequence spread spectrum signals, frequency hopping spread spectrum signals, time hopping spread spectrum signals, and linear frequency sweeping signals (i.e., linear FM chirp signals). Exponential FM chirp signals may also be used.

Figure 5C:
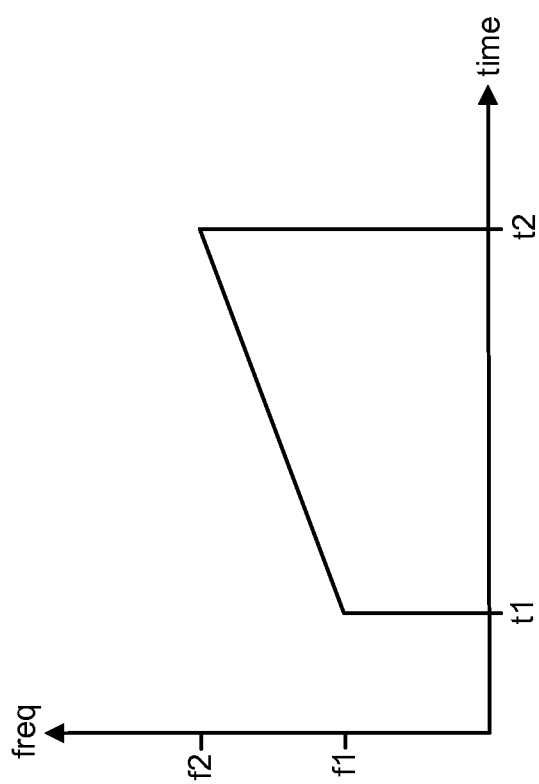
FIG. 5C depicts one embodiment of a linear FM chirp signal.

FIG. 5C depicts one embodiment of a linear FM chirp signal. At time t1, the chirp signal is associated with frequency f1. At time t2, the chirp signal is associated with frequency f2. From time t1 to time t2, the chirp signal frequency increases linearly with time.

In one embodiment, each coil driver in FIG. 5B generates a drive signal comprising a continuous stream of linear FM chirps. The linear FM chirps generated by each coil driver may be identical in shape, but are shifted in time. The chirp duration may be synchronized to the stylus position update cycle so that each update is based on the signals generated from one complete chirp. In one example, f1 may be 160 kHz, f2 may be 190 kHz, and the time difference between t1 and t2 may be 5 ms. Each FM chirp signal generated by signal generator 548 in FIG. 5A may be shifted in time by 625 μs (i.e., by $1/8^{th}$ of the stylus update cycle of 200 updates per second).

Figure 5D:
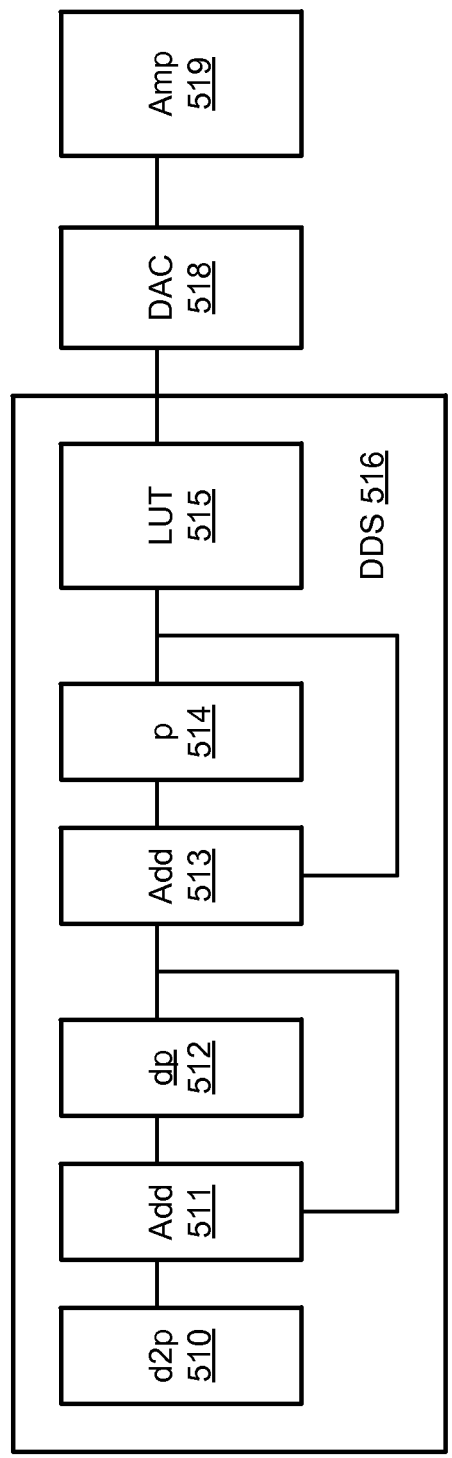
FIG. 5D depicts one embodiment of a coil driver.

FIG. 5D depicts one embodiment of a coil driver 502. The embodiment depicted in FIG. 5D may also be applicable to any of the other coil drivers 503-509 of FIG. 5B. Coil driver 502 includes a direct digital synthesizer (DDS) 516, a digital to analog converter (DAC) 518, and an amplifier 519. Each DDS consists of a phase accumulator 514 (p 514), phase increment register 512 (dp 512), and phase increment change register 510 (d2p 510). The phase increment change register 510 contains a constant that determines the rate of frequency change of the FM chirp. Adder block 511 (add 511) adds the value stored in the phase increment change register 510 with the value stored in the phase increment register 512. Thus, the value stored in the phase increment register 512 will increase by the value stored in the phase increment change register 510 every DDS clock cycle. In one example, the DDS clock runs at a 2 MHz update rate. Adder block 513 (add 513) adds the value stored in the phase increment register 512 with the value stored in the phase accumulator 514. Thus, the value stored in the phase accumulator 514 will increase by the value stored in the phase increment register 512 every DDS clock cycle. The value stored in phase accumulator 514 is input to lookup table 515 (LUT 515) in order to generate a continuous sine wave signal. In one example, lookup table 515 may comprise a sine wave table and need only store $1/4^{th}$ of a sine wave due to symmetry of the function.

The output of DDS 516 is converted to an analog signal via DAC 518. The output of DAC 518 is buffered prior to driving a particular transmitting coil via amplifier 519 (Amp 519). In one embodiment, a single DDS block can be shared across multiple coil drivers via time multiplexing. The output of amplifier 519 is used to drive a particular transmitting coil, such as the one of the one or more transmitting coils within coils 550 of FIG. 5A. This causes the particular transmitting coil to generate a magnetic field which may be subsequently detected by one or more receiving coils within a stylus.

FIG. 5E depicts one embodiment of a stylus 250. Stylus 250 includes three receiving coils 571-573. The three receiving coils 571-573 may be three orthogonal receiving coils. The three receiving coils may be wound around a single, common ferrite core. Each of the three receiving coils 571-573 drives a low-noise preamplifier (amp 574, amp 575, and amp 576, respectively). Each of the low-noise preamplifiers 574-576 is used to sense and amplify an induced voltage across a particular receiving coil. In one embodiment, the outputs of low-noise preamplifiers 574-576 may comprise sensing information associated with the sensed magnetic field strength from each of one or more transmission coils (e.g., from the one or more transmitting coils within coils 550 of FIG. 5A) to each of the receiving coils 571-573. Each of the low-noise preamplifiers 574-576 drives a mixer (mixer 580, mixer 581, and mixer 582, respectively). Each mixer of mixers 580-582 inputs two signals of first and second frequencies and outputs a new signal comprising the sum of the first and second frequencies and the difference of the first and second frequencies. Mixers are commonly used to shift signals from one frequency range to another via a process known as heterodyning.

Pilot tone generator 586 generates a pilot tone signal. A pilot tone may include a single reference frequency. In one example, the pilot tone frequency is generated by a crystal oscillator oscillating at 32.768 kHz. A phase-locked loop (PLL) may be used to generate an output signal of a higher frequency than a given input signal. The output signal frequency from a PLL may be higher than the given input signal frequency by a predetermined multiple. Multiplying PLLs 577-579 generate output signals of six times, seven times, and eight times the pilot tone frequency, respectively.

Mixer 580 mixes an amplified version of the voltage sensed at receiving coil 571 with a signal at six times the pilot tone frequency. Mixer 581 mixes an amplified version of the voltage sensed at receiving coil 572 with a signal at seven times the pilot tone frequency. Mixer 582 mixes an amplified version of the voltage sensed at receiving coil 573 with a signal at eight times the pilot tone frequency. After the mixing process, the signals from each of the receiving coils are shifted to occupy three separate, adjacent channels. Summing circuitry 583 (sum 583) combines the outputs of mixers 580-582. Further, summing circuitry 583 may combine the pilot tone signal in order to transmit the pilot tone to a stylus controller. In one embodiment, the pilot tone signal may be modulated in order to transmit auxiliary data, such as the force on the tip of a stylus or the state of a button on a stylus.

The summed output of summing circuitry 583 is input to low-pass filter (LPF) 584 in order to remove the image bands from the mixing process. In one example, LPF 584 comprises a single pole filter that removes all frequencies above 100 kHz. Thereafter, the output of LPF 584 may include three signal bands associated with the three receiving coils. In one example, the first signal band may include signal frequencies between two and 32 kHz, the second signal band may include signal frequencies between 34 and 64 kHz, and the third signal band may include signal frequencies between 66 and 96 kHz. The output of LPF 584 drives a single transmitter 585. In one example, transmitter 585 may comprise an FM or RF transmitter. In some embodiments, each of the three low-noise preamplifiers 574-576 may drive one of three different transmitters directly (i.e., sensing information may be transmitted directly to a stylus controller without mixing or summing being performed).

Because most of the signal processing is performed by a stylus controller, the total energy consumption associated with stylus 250 is minimized. To further reduce energy consumption, the FM transmitter may be turned off after some period of inactivity. The FM transmitter may be enabled again once a stylus tip depression or a stylus button push has been detected.

Figure 5F:
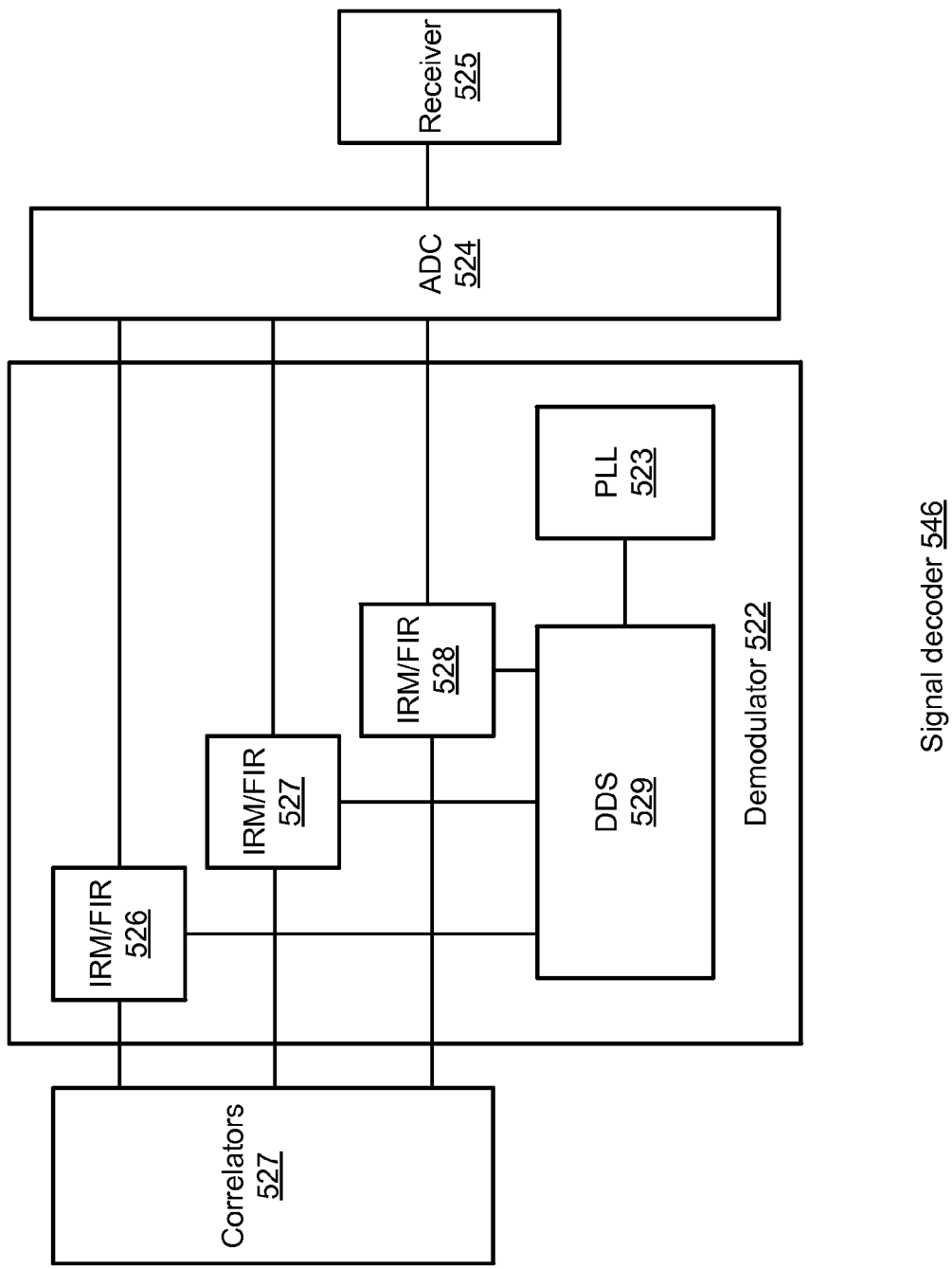
FIG. 5F depict one embodiment of a signal decoder.

FIG. 5F depicts one embodiment of a signal decoder 546. Signal decoder 546 includes receiver 525, analog to digital converter (ADC) 524, demodulator 522, and one or more correlators 527. Receiver 525 may comprise an FM or RF receiver. Demodulator 522 includes PLL 523, DDS 529, and IRM/FIR blocks 526-528. The output of receiver 525 is converted to a digital signal via ADC 524. In one example, ADC 524 comprises a 16-bit ADC. The output of ADC 524 is used by demodulator 522 in order to extract sensing information generated by the stylus.

The pilot tone signal received in the RF transmission by receiver 525 may be used by PLL 523 to lock onto the pilot tone from the stylus. The pilot tone allows for the reconstruction of the X, Y, and Z components from the receiving coils in the stylus which were frequency multiplexed onto the single RF signal received by receiver 525. Once the PLL has locked onto the pilot tone, the PLL output may be used by DDS 529 to reproduce the three intermediate frequencies at six, seven, and eight times the pilot tone frequency. In one example, a single DDS can generate the three intermediate frequencies by multiplying the output of the PLL by an appropriate constant. DDS 529 may also generate quadrature signals for use by image reject mixers (IRMs).

Once the intermediate frequencies have been generated, IRM/FIR blocks 526-528 may be utilized to separate out the three signals associated with the three receiving coils in the stylus. This may be accomplished by bandpass filtering the appropriate band and then multiplying the filtered signal by the appropriate intermediate frequency. Thus, demodulator 522 extracts and outputs three signals associated with the three receiving coils in the stylus.

The three outputs of demodulator 522 are used to drive one or more correlators 527. Each of the one or more correlators 527 detects and/or extracts three signals associated with a particular transmitting coil (e.g., one of the eight transmitting coils 321-328 in FIG. 3A). Thus, the output of the one or more correlators 527 may comprise a set of field numbers that represent the sensed field strength from each transmitting coil to each of the three receiving coils in the stylus. In one example, the one or more correlators 527 may comprise eight correlators; one correlator for each of the eight transmitting coils 321-328 in FIG. 3A. In this case, the state of the 24 correlator outputs (i.e., three signals associated with each of the three receiving coils in the stylus for each of the eight transmitting coils) may be outputted to a stylus driver, such as stylus position and orientation logic 542 in FIG. 5A, every update cycle.

In one embodiment, the one or more correlators comprise one or more spread spectrum correlators. Each of the one or more spread spectrum correlators may respond only to signals that are encoded with a special pseudonoise code that matches its own code. The one or more correlators 527 may also include one or more multiply-accumulate blocks and one or more DDSs for phase shifting the input signals by an appropriate amount in order to enable coherent detection.

Figure 6:
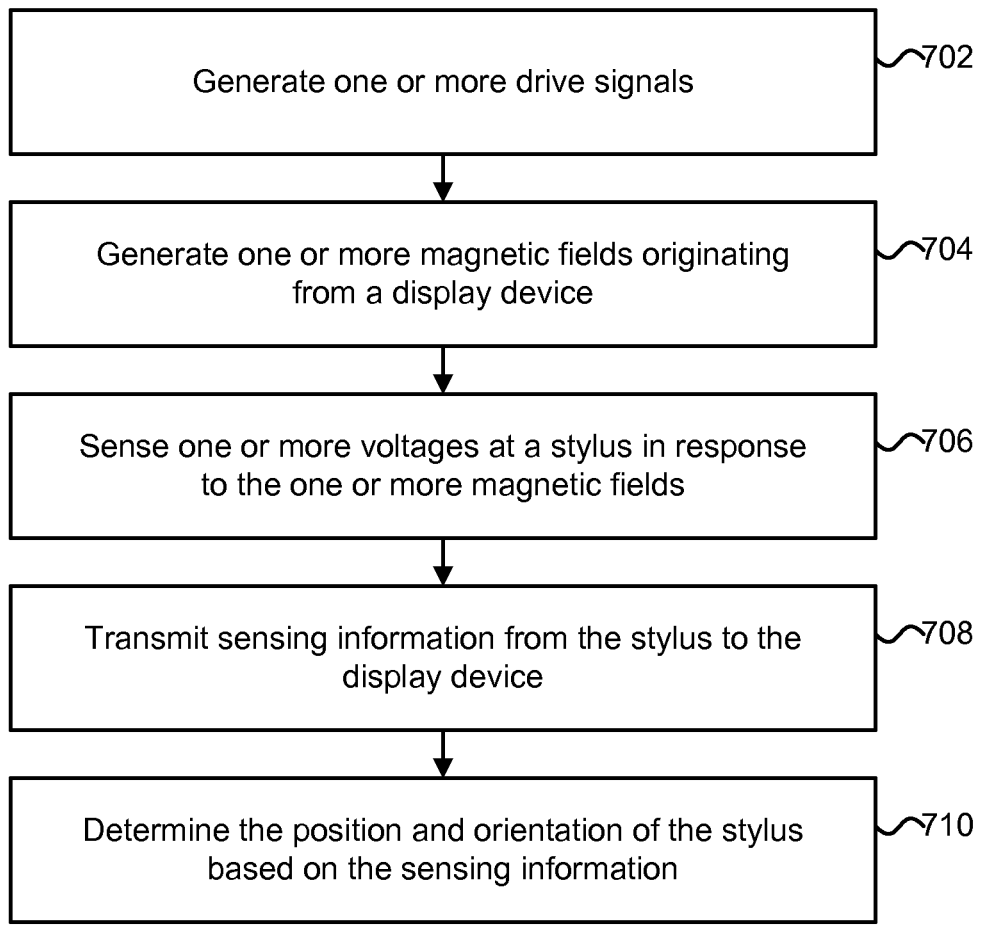
FIG. 6 is a flowchart describing one embodiment of a process for determining the position and orientation of a stylus.

FIG. 6 is a flowchart describing one embodiment of a process for determining the position and orientation of a stylus. The aforementioned process may be performed continuously and by one or more computing devices. Each step in the aforementioned process may be performed by the same or different computing devices as those used in other steps, and each step need not necessarily be performed by a single computing device. In one embodiment, the process of FIG. 6 is performed by stylus system 540 in FIG. 5A.

In step 702, one or more drive signals are generated. The one or more drive signals may be generated using a signal generator, such as signal generator 548 in FIG. 5A. In step 704, one or more magnetic fields originating from a display device are generated. The one or more magnetic fields may be generated using one or more transmitting coils, such as those found in coils 550 of FIG. 5A. In step 706, one or more voltages are sensed at a stylus in response to the one or more magnetic fields generated in step 704. The one or more voltages may be sensed by one or more receiving coils, such as receiving coils 571-573 in FIG. 5E. In step 708, sensing information is transmitted from the stylus to the display device. The sensing information may be transmitted via an RF link. In step 710, the position and orientation of the stylus is determined based on the received sensing information. The position and orientation of the stylus may be determined by a stylus controller, such as stylus controller 544 in FIG. 5A.

Figure 7:
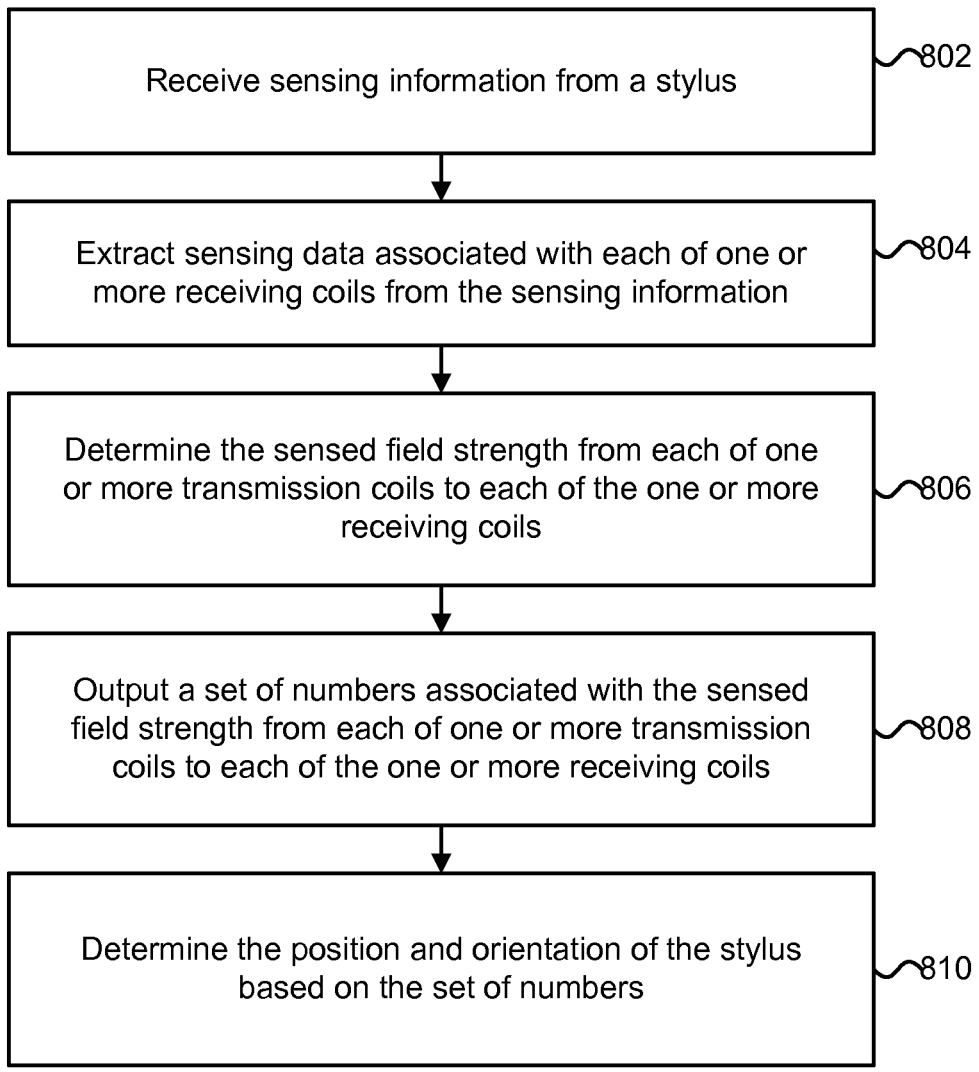
FIG. 7 is a flowchart describing one embodiment of a process for determining the position and orientation of a stylus given sensing information received from a stylus.

FIG. 7 is a flowchart describing one embodiment of a process for determining the position and orientation of a stylus given sensing information received from a stylus. The process depicted in FIG. 7 is one example of a process for implementing step 710 in FIG. 6. The aforementioned process may be performed continuously and by one or more computing devices. Each step in the aforementioned process may be performed by the same or different computing devices as those used in other steps, and each step need not necessarily be performed by a single computing device. In one embodiment, the process of FIG. 7 is performed by a stylus controller, such as stylus controller 544 in FIG. 5A.

In step 802 of FIG. 7, sensing information is received from a stylus. The sensing information may be received as a single data stream and include voltage information associated with the sensed magnetic field strength at each of one or more receiving coils. In step 804, sensing data associated with each of one or more receiving coils is extracted from the sensing information. The sensing data may include data values associated with the voltage sensed at a particular receiving coil. In one example, sensing data associated with each of one or more receiving coils may be extracted using a demodulator, such as demodulator 522 in FIG. 5F.

In step 806, the sensed field strength from each of one or more transmission coils to each of the one or more receiving coils is determined. In one example, the sensed field strength from each of the one or more transmission coils to each of the one or more receiving coils may be determined using one or more correlators, such as one or more correlators 527 in FIG. 5F.

In step 808, a set of numbers associated with the sensed field strength from each of one or more transmission coils to each of one or more receiving coils is outputted. In one example, the set of numbers comprise a set of field numbers that represent the sensed field strength from each of the one or more transmitting coils to each of the one or more receiving coils in the stylus. The set of numbers may be outputted to a stylus driver, such as stylus position and orientation logic 542 in FIG. 5A. In step 810, the position and orientation of the stylus is determined based on the set of numbers. In one example, a stylus driver, such as stylus position and orientation logic 542 in FIG. 5A, determines the position and orientation of the stylus using a cell-based position reconstruction technique.

Figure 8A:
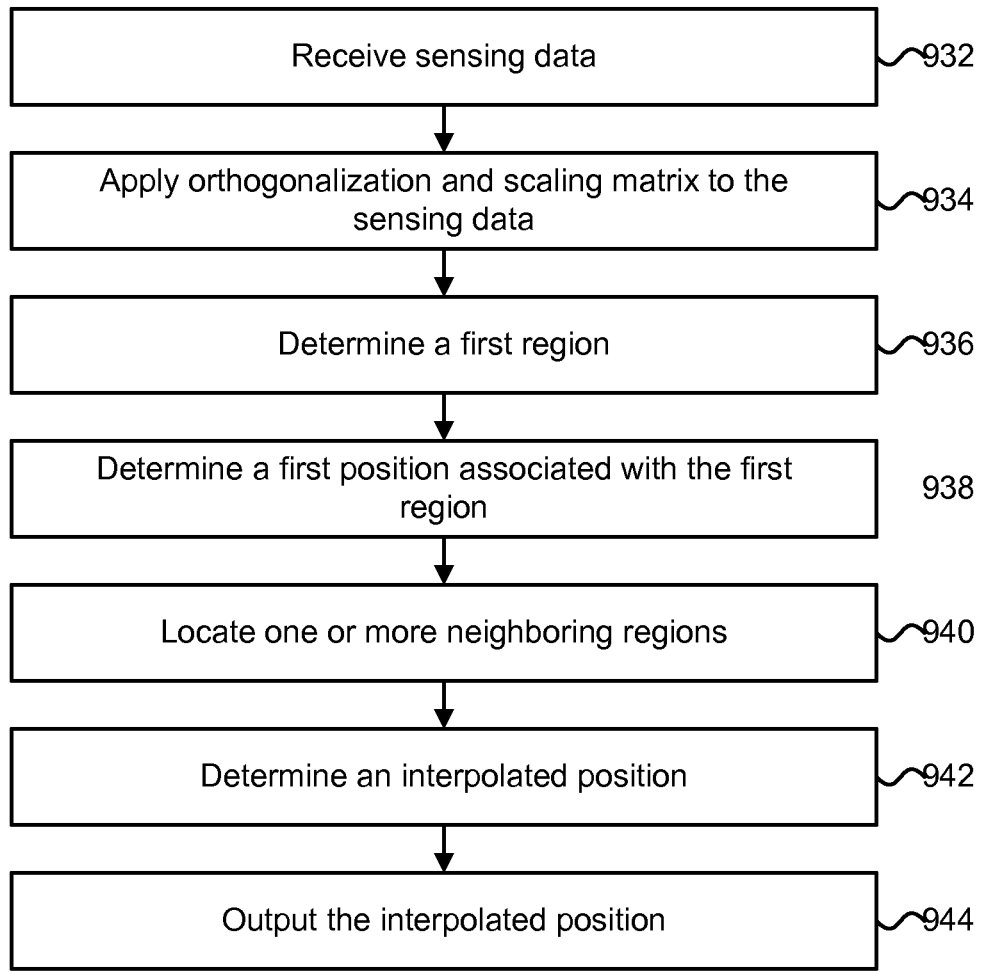
FIG. 8A is a flowchart describing one embodiment of a process for determining the position of a stylus.

FIG. 8A is a flowchart describing one embodiment of a process for determining the position of a stylus. The process depicted in FIG. 8A is one example of a process for implementing step 810 in FIG. 7. The aforementioned process may be performed continuously and by one or more computing devices. Each step in the aforementioned process may be performed by the same or different computing devices as those used in other steps, and each step need not necessarily be performed by a single computing device. In one embodiment, the process of FIG. 8A is performed by a stylus driver, such as stylus position and orientation logic 542 in FIG. 5A.

In step 932 of FIG. 8A, field strength data is received. In one example, the field strength data is received from a signal decoder, such as signal decoder 546 in FIG. 5A. In step 934, an orthogonalization and scaling matrix is applied to the field strength data. The orthogonalization and scaling matrix may be used to correct for unequal gain in the low-noise preamplifiers, asymmetries in coil geometry, and the fact that is not practical to perfectly arrange the three receiving coils to be exactly orthogonal to each other. Further, offsets from the three receiving coils in a stylus to the tip of the stylus may be taken into account. In step 936, a first region is determined. The first region may correspond with a predetermined region, such as one of the one or more predetermined regions (or cells) 610 of FIG. 4B, that best matches the field strength data. In one example, the determination of the first region may include comparing a predetermined field magnitude associated with the first region with the field strength data. In some embodiments, a previously determined stylus position may be used to help determine the first region.

In step 938, a first position associated with the first region is determined. The first position may comprise X, Y, and Z coordinates in relation to the surface of a display device. In step 940, one or more neighboring regions are located. The one or more neighboring regions may be associated with one or more predetermined regions neighboring the predetermined region that best matched the field strength data. In step 942, an interpolated position is determined using the field strength data associated with the one or more neighboring regions. In step 944, the interpolated position is outputted as the position of a stylus. For example, the interpolated position may be outputted to an application running on a display device.

Figure 8B:
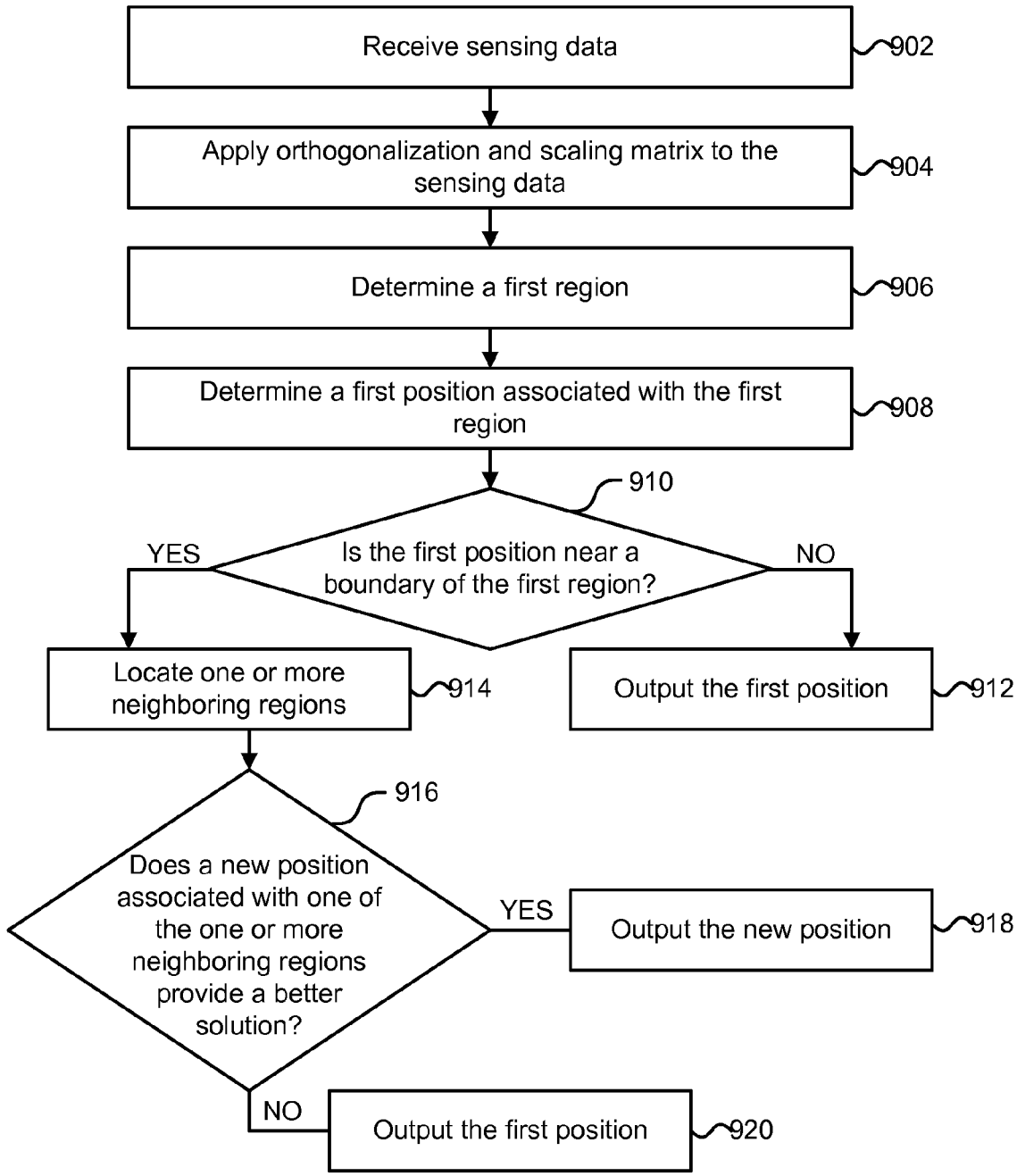
FIG. 8B is a flowchart describing another embodiment of a process for determining the position of a stylus.

FIG. 8B is a flowchart describing another embodiment of a process for determining the position of a stylus. The process depicted in FIG. 8B is one example of a process for implementing step 810 in FIG. 7. The aforementioned process may be performed continuously and by one or more computing devices. Each step in the aforementioned process may be performed by the same or different computing devices as those used in other steps, and each step need not necessarily be performed by a single computing device. In one embodiment, the process of FIG. 8B is performed by a stylus driver, such as stylus position and orientation logic 542 in FIG. 5A.

In step 902, field strength data is received. In one example, the field strength data is received from a signal decoder, such as signal decoder 546 in FIG. 5A. In step 904, an orthogonalization and scaling matrix is applied to the field strength data. The orthogonalization and scaling matrix may be used to correct for unequal gain in the low-noise preamplifiers, asymmetries in coil geometry, and the fact that is not practical to perfectly arrange the three receiving coils to be exactly orthogonal to each other. Further, offsets from the three receiving coils in a stylus to the tip of the stylus may be taken into account. In step 906, a first region is determined. The first region may correspond with a predetermined region, such as one of the one or more predetermined regions (or cells) 610 of FIG. 4B, that best matches the field strength data. In one example, the determination of the first region may include comparing a predetermined field magnitude associated with the first region with the field strength data. In some embodiments, a previously determined stylus position may be used to help determine the first region.

In step 908, a first position associated with the first region is determined. The first position may comprise X, Y, and Z coordinates in relation to the surface of a display device. In step 910, it is determined whether the first position is near a boundary of the first region. If the first position is determined to be not near a boundary of the first region, then the first position is outputted in step 912. Otherwise, if the first position is determined to be near a boundary of the first region, then one or more neighboring regions are located in step 914. The one or more neighboring regions may be associated with one or more predetermined regions neighboring the predetermined region that best matched the field strength data in step 906. In step 916, it is determined whether a new position associated with one of the one or more neighboring regions provides a better solution. If a new position provides a better solution, then the new position is outputted in step 918. Otherwise, if the first position provides a better solution, then the first position is outputted in step 920.

Figure 9:
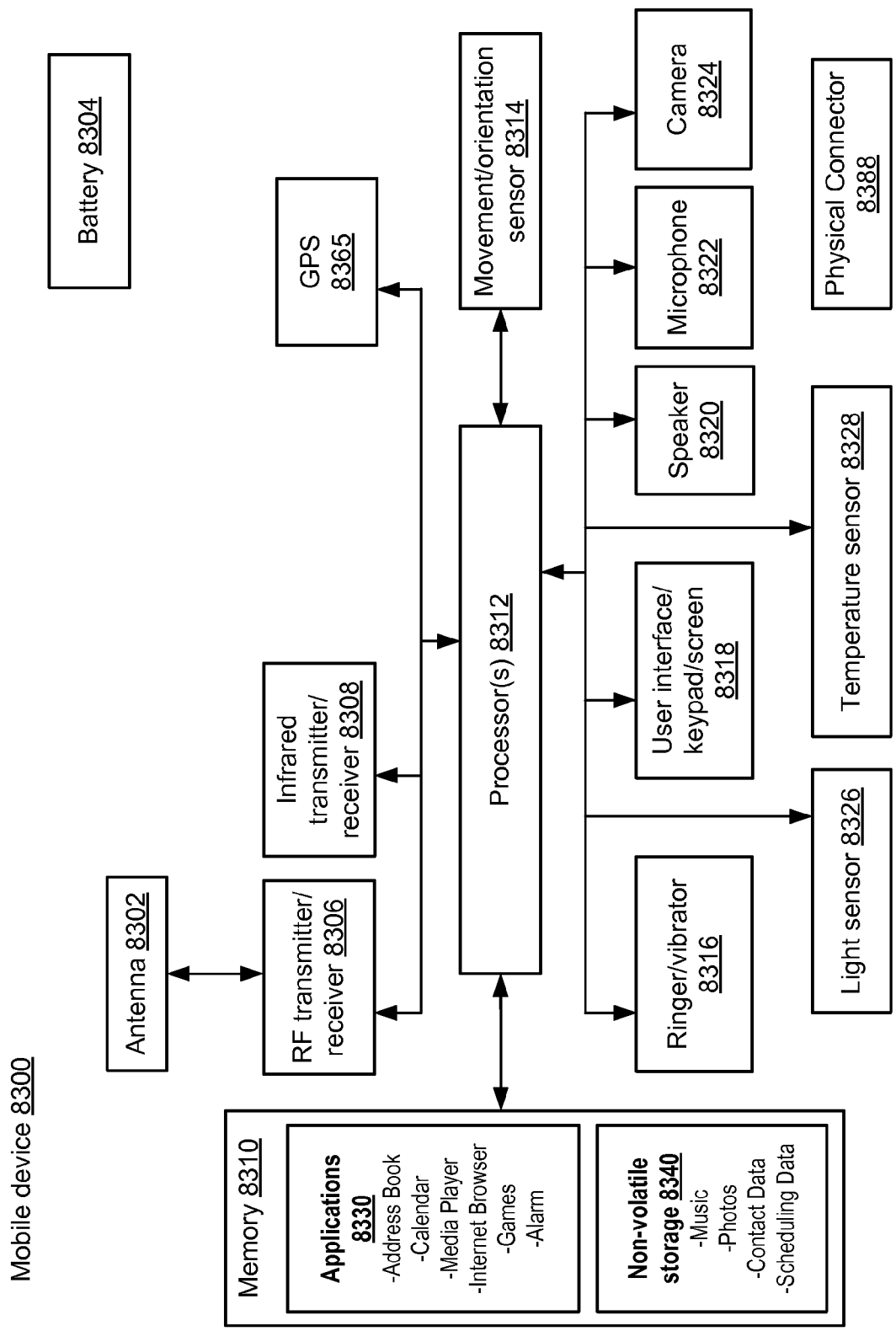
FIG. 9 is a block diagram of one embodiment of a mobile device.
Figure 10:
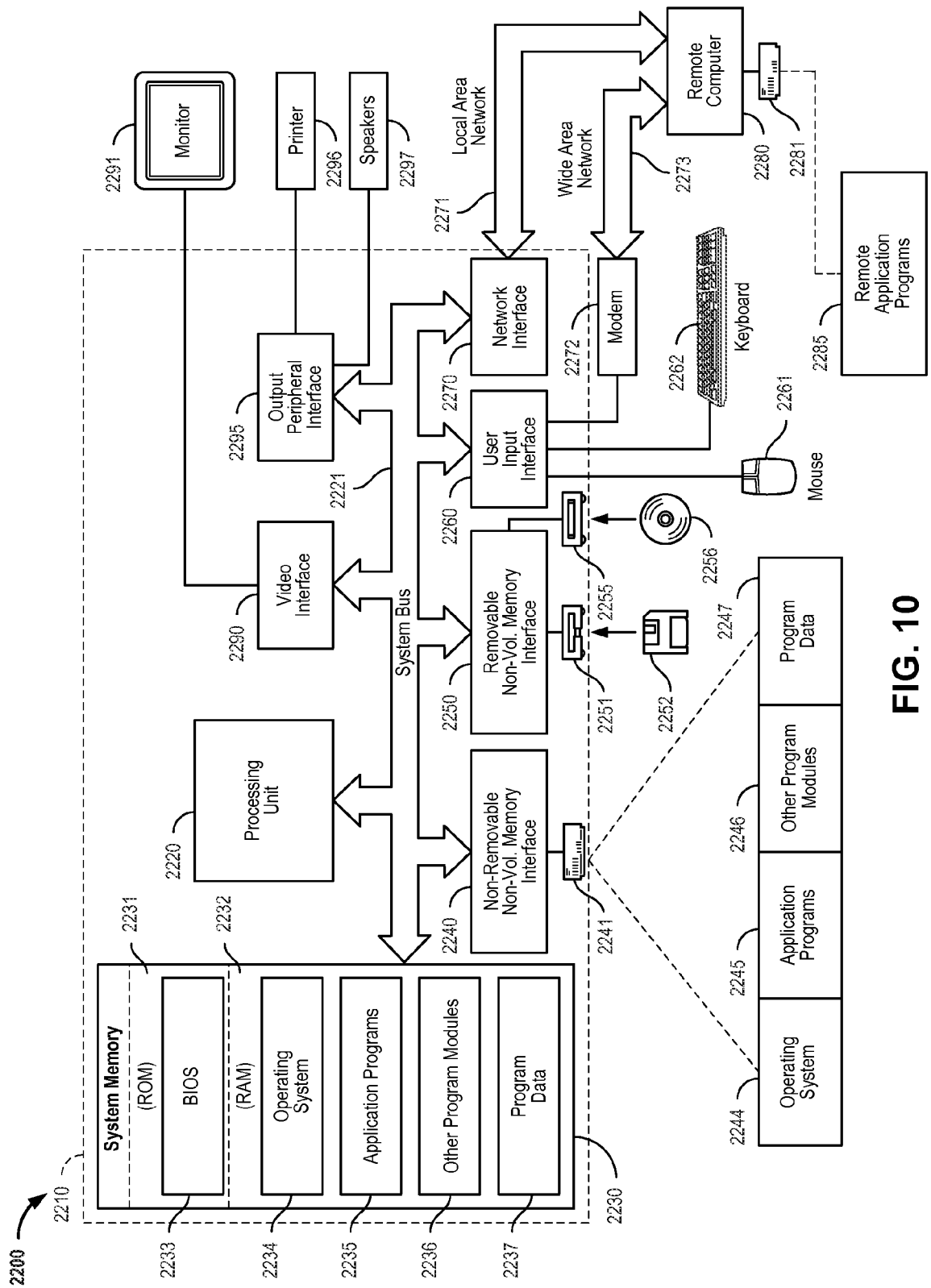
FIG. 10 is a block diagram of an embodiment of a computing system environment.

The disclosed technology may be used with various computing systems. FIGS. 9-10 provide examples of various computing systems that can be used to implement embodiments of the disclosed technology.

FIG. 9 is a block diagram of one embodiment of a mobile device 8300, such as mobile device 140 in FIG. 1. Mobile devices may include laptop computers, pocket computers, mobile phones, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

FIG. 10 is a block diagram of an embodiment of a computing system environment 2200, such as computer 130 in FIG. 1. Computing system environment 2200 includes a general purpose computing device in the form of a computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. By way of example, and not limitation, FIG. 10 illustrates operating system 2234, application programs 2235, other program modules 2236, and program data 2237.

The computer 2210 may also include other removable/non-removable, volatile/nonvolatile computer storage media. By way of example only, FIG. 10 illustrates a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media discussed above and illustrated in FIG. 10, provide storage of computer readable instructions, data structures, program modules and other data for the computer 2210. In FIG. 10, for example, hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210, although only a memory storage device 2281 has been illustrated in FIG. 10. The logical connections depicted in FIG. 10 include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. By way of example, and not limitation, FIG. 10 illustrates remote application programs 2285 as residing on memory device 2281. It will be appreciated that the network connections shown are exemplary and other means of establishing a communications link between the computers may be used.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for determining a position of a stylus, comprising:
    generating one or more drive signals, each of the one or more drive signals is associated with a particular transmission coil of one or more transmission coils, the one or more transmission coils are associated with a display device;
    generating one or more magnetic fields, each of the one or more magnetic fields is associated with a particular drive signal of the one or more drive signals;
    sensing one or more voltages, each of the one or more voltages is associated with a particular receiving coil of one or more receiving coils, the one or more voltages are generated by the one or more magnetic fields, the one or more receiving coils are associated with the stylus;
    transmitting sensing information based on the one or more voltages from the stylus to the display device, the sensing information includes a set of field numbers that represent the sensed magnetic field strength from each of the one or more transmission coils to each of the one or more receiving coils; and
    determining the position of the stylus within one or more predetermined regions located above a surface of the display device, the determining the position of the stylus includes determining a first region of the one or more predetermined regions based on the received sensing information, the first region is associated with one or more polynomials describing magnetic fields associated with each of the one or more transmission coils, the determining the position of the stylus includes determining one or more neighboring regions adjacent to the first region, the determining the position of the stylus includes determining an interpolated position of the stylus based on magnetic field strength data associated with the one or more neighboring regions and the first region.

2. The method of claim 1, wherein:
    the transmitting sensing information includes transmitting the sensing information over a single RF channel from the stylus to the display device.

3. The method of claim 2, wherein:

the determining the first region includes comparing a predetermined field magnitude associated with the first region with a particular number of the set of field numbers; and the first region comprises a cubic region.

4. The method of claim 1, wherein:

the determining the position of the stylus includes determining a three-dimensional position of the stylus located above the surface of the display device and an orientation of the stylus.

5. The method of claim 1, further comprising:

determining a stylus input based on whether the stylus is in contact with the surface of the display device or located above the surface of the display device.

6. The method of claim 1, wherein:

the one or more drive signals are time multiplexed such that only one of the one or more transmission coils generates a magnetic field at a particular point in time.

7. The method of claim 1, wherein:

the one or more transmission coils include at least two coils arranged in a first direction and at least two other coils arranged in a second direction orthogonal to the first direction.

8. A stylus system, comprising:

a stylus, the stylus includes one or more receiving coils, the one or more receiving coils include a first coil arranged in a first direction and a second coil arranged in a second direction, the one or more receiving coils include a third coil arranged in a third direction, the first direction is orthogonal to the second direction and the third direction, the second direction is orthogonal to the first direction and the third direction; and a display device, the display device includes a stylus controller and one or more transmission coils, the stylus controller generates one or more drive signals, each of the one or more drive signals is associated with a particular transmission coil of the one or more transmission coils, the stylus controller drives each of the one or more transmission coils with a particular drive signal of the one or more drive signals, the stylus controller receives sensing information from the stylus based on one or more magnetic fields associated with the one or more transmission coils, the sensing information includes a set of field numbers that represent the sensed magnetic field strength from each of the one or more transmission coils to each of the one or more receiving coils, the stylus controller determines a three-dimensional position of the stylus within a volume located above a surface of the display device, the volume is associated with one or more predetermined regions, the one or more predetermined regions are located relative to the surface of the display device, the determination of the position of the stylus includes determining a first region of the one or more predetermined regions based on the received sensing information, the first region is associated with one or more polynomials describing magnetic fields associated with each of the one or more transmission coils, the stylus controller determines one or more neighboring regions adjacent to the first region, the stylus controller determines an interpolated position of the stylus based on magnetic field strength data associated with the one or more neighboring regions and the first region.

9. The stylus system of claim 8, wherein:

the stylus controller determines the three-dimensional position of the stylus within the volume located above the surface of the display device and an orientation of the stylus; and the stylus determines a stylus input based on whether the stylus is in contact with the surface of the display device or located above the surface of the display device.

10. The stylus system of claim 9, wherein:

the determining the first region includes comparing a predetermined field magnitude associated with the first region with a particular number of the set of field numbers; and the first region comprises a cubic region.

11. The stylus system of claim 10, wherein:

each of the one or more drive signals includes an FM chirp signal.

12. The stylus system of claim 11, wherein:

the stylus controller receives sensing information over a single RF channel.

13. The stylus system of claim 8, wherein:

the one or more drive signals are time multiplexed such that only one of the one or more transmission coils generates a magnetic field at a particular point in time.

14. The stylus system of claim 8, wherein:

the one or more transmission coils include at least two coils arranged in a first direction and at least two other coils arranged in a second direction orthogonal to the first direction.

15. One or more storage devices containing processor readable code for programming one or more processors to perform a method for determining a position of a stylus comprising the steps of:

calibrating one or more predetermined regions associated with a display device, the one or more predetermined regions are located relative to a surface of the display device;

generating one or more drive signals, each of the one or more drive signals is associated with a particular transmission coil of one or more transmission coils, the one or more transmission coils are associated with the display device, the one or more transmission coils include at least two coils arranged in a first direction and at least two other coils arranged in a second direction orthogonal to the first direction;

generating one or more magnetic fields, each of the one or more magnetic fields is associated with a particular drive signal of the one or more drive signals;

sensing one or more voltages, each of the one or more voltages is associated with a particular receiving coil of one or more receiving coils, the one or more voltages are generated by the one or more magnetic fields, the one or more receiving coils are associated with the stylus;

transmitting sensing information based on the one or more voltages from the stylus to the display device, the sensing information includes voltage information associated with the sensed magnetic field strength from each of the one or more receiving coils; and determining the position of the stylus within a volume located above the surface of the display device using a cell-based position reconstruction technique, the volume is associated with the one or more predetermined regions, the cell-based position reconstruction technique includes determining a first region of the one or more predetermined regions based on the received sensing information, the cell-based position reconstruction technique includes determining one or more neighboring regions of the one or more predetermined regions that are adjacent to the first region and determining an interpolated position of the stylus based on magnetic field strength data associated with the one or more neighboring regions and the first region, the determining the position of the stylus includes determining a three-dimensional position of the stylus located above the surface of the display device and an orientation of the stylus relative to the surface of the display device, the calibrating one or more predetermined regions includes acquiring a first set of magnetic field information associated with a first positioning of the stylus above the display device in a third direction such that a tip of the stylus is located at a center point of the first region and acquiring a second set of magnetic field information associated with a second positioning of the stylus above the display device in a fourth direction opposite to the third direction such that the tip of the stylus is located at the center point of the first region.

16. The one or more storage devices of claim 15, wherein: the first region the first region comprises a cubic region.

17. The one or more storage devices of claim 15, wherein:
the sensing information is transmitted over a single RF channel;
each of the one or more drive signals includes an FM chirp signal; and
the first region is associated with a set of vectors, each vector of the set of vectors includes magnetic field information associated with a particular position and a particular orientation of the stylus within the first region.

* * * * *